United States Patent [19]
Gross

[11] 3,716,224
[45] Feb. 13, 1973

[54] DEVICE FOR HOLDING A WORKPIECE

[75] Inventor: Max Gross, Winterthur, Switzerland

[73] Assignee: Werkzeugmaschinenfabrik Oerlikoon-Buhrle AG, Zurich, Switzerland

[22] Filed: July 22, 1970

[21] Appl. No.: 57,075

[30] Foreign Application Priority Data

July 23, 1969 Switzerland..................11241/69

[52] U.S. Cl.............269/48.1, 266/6 PC, 148/131, 72/403, 269/52, 269/287
[51] Int. Cl. .........................C21d 9/32, C21d 1/64
[58] Field of Search.........269/48.1, 49, 52, 287, 288; 279/1 DA, 1 DC, 108, 120, 122; 214/1 P; 148/131; 266/6 PC; 72/399, 403

[56] References Cited

UNITED STATES PATENTS

| | | | |
|---|---|---|---|
| 2,394,841 | 2/1946 | Bugg | 279/1 DA |
| 3,542,383 | 11/1970 | Farley | 279/1 DA |
| 2,070,897 | 2/1937 | Hall | 279/122 |
| 2,818,786 | 1/1958 | Hammer | 269/135 |
| 3,170,975 | 2/1965 | Baner | 266/6 PC |
| 3,334,882 | 8/1967 | Rossbach | 148/131 X |

*Primary Examiner*—Othell M. Simpson
*Attorney*—Wenderoth, Lind & Ponack

[57] ABSTRACT

A holder for a workpiece having a tubular portion to be used during quenching when hardening the same. A centering element grips the workpiece from the inside and clamping means grips the tubular portion from the outside at the level of the centering element. The clamping means has an adapter with a clamping bell movable axially therein. The bell is resiliently radially deformable with its internal diameter substantially equal to the external diameter of the workpiece to be quenched. The wall of the clamping bell is divided by axial incisions into a plurality of fingers which have convexly shaped inner and outer surfaces and the transverse dimension of the wall is less between the base of the bell and the fingers than that of the fingers. The adapter has a skirt circling the clamping bell and the inner surface of the skirt has a conical face for cooperation with the convexly shaped outside surfaces of the fingers.

3 Claims, 1 Drawing Figure

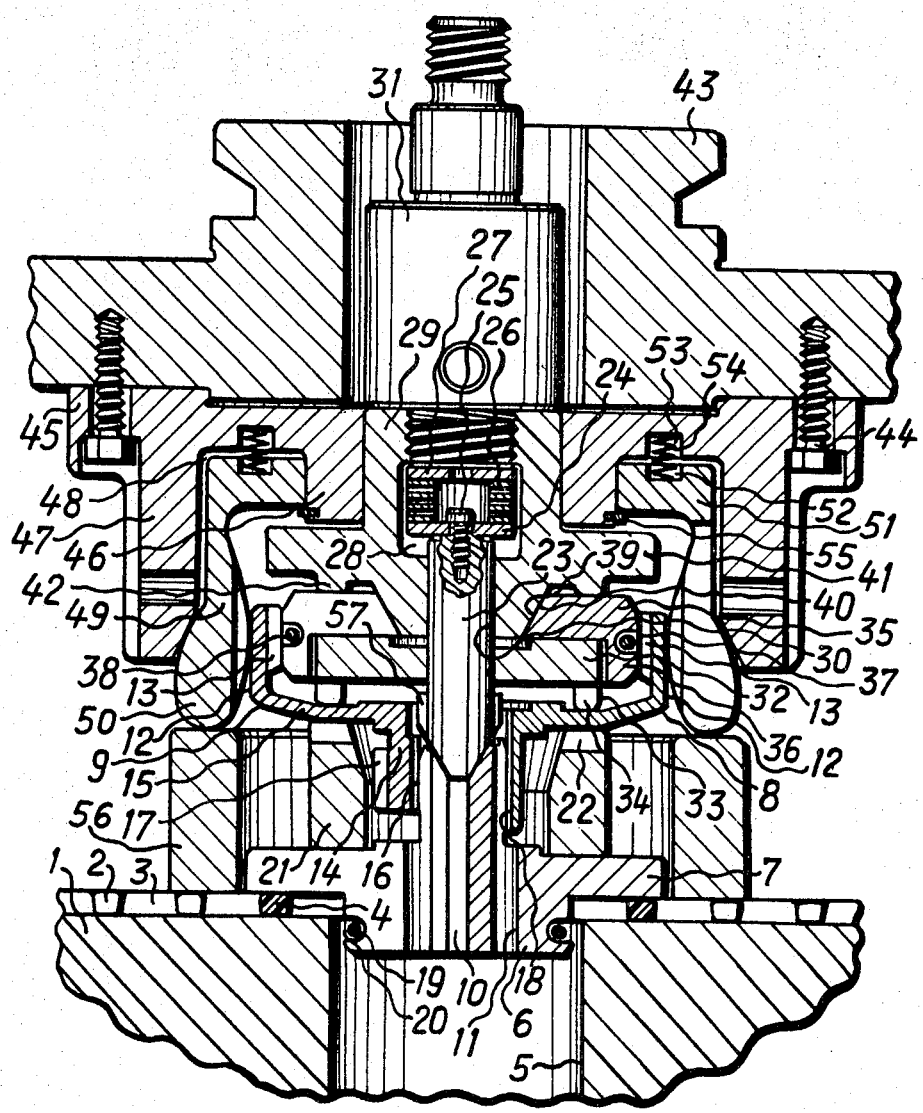
MAX GROSS, Inventor
BY Wenderoth, Lind & Ponack
Attorneys

DEVICE FOR HOLDING A WORKPIECE

The invention relates to a device for holding a workpiece having a tubular portion during quenching when hardening the same and in particular to a device for holding a gearwheel.

A conventional device of this kind is suitable only for gripping and holding plate-shaped or flat annular workpieces because it merely consists of a ring for holding down the workpiece on a flat base.

It is the object of the present invention to overcome this limitation.

A device according to the invention for holding a workpiece having a tubular portion during quenching when hardening the same comprises a centering element for gripping the workpiece from the inside and clamping means for gripping the tubular portion from the outside at the level of the centering element.

The invention is illustrated by way of example in the accompanying drawing which is an axial section of a device according to the invention for holding a workpiece.

With reference to the drawing a number of circular grooves 2 and radial grooves 3 are machined into a bed 1 of a press. A sealing ring 4 is inserted into the innermost of the circular grooves 2. The press bed 1 contains a central bore 5. A centering die 6 projects into the central bore 5. The centering die 6 is formed with a collar 7 of enlarged diameter which rests on the bed 1 of the press. The upper part of the centering die 6 is of reduced diameter, slightly smaller than the internal diameter of a workpiece 8 or 9 that is to be gripped. The centering die 6 has a central bore 10 which conically diverges at the upper end of the centering die 6. Disposed on a circle of a diameter equal to that of the upper part of the centering die 6 are the centers of a plurality of further bores 11 which are parallel to the center bore 10.

Two examples of workpieces 8 and 9 which may be held in the holder are indicated in the drawing. Each of the workpieces comprise a first tubular portion 12 with internal gear teeth 13 and a second tubular portion or bushing 14 of considerably smaller diameter than the first tubular portion. A middle portion 15 in the form of a disc connects the tubular portion 12 and the bushing 14. The internal surface of the bushing 14 is provided with splines 16 for engagement with corresponding splines on a shaft. The bushing 14 of the workpiece 9 has in addition external gear teeth 17. The upper part of the centering die 6 is provided with a machined external surface 18 which bears against the inside of the bushing 14 of either of the two workpieces 8 or 9. Since the bushings 14 of the two workpieces 8, 9 differ in length and diameter the centering dies 6 for the two workpieces likewise have upper parts of different diameters and lengths. Each centering die 6 is divided by a number of radial planes into a plurality of segments. The part of the centering die extending into the center bore 5 in the press bed 1 has a peripheral groove 20. The peripheral groove 20 contains a spring ring 19 which encircles the several segments into which the centering die 6 is divided.

The disc portion 15 of the workpiece 8 or 9 rests on the face of a supporting ring 21 which itself bears on the collar 7 of the centering die 6. The face of the supporting ring 21 upon which the workpiece 8 or 9 rests is formed with radial slots 22 spaced around the periphery of the face. Another supporting ring 56 rests on the press bed 1 and concentrically encircles the centering die 6 and the supporting ring 21.

A centering 23 has a conically tapering point. Above this tapering point the centering plunger 23 is formed with dogs 57 projecting from the outer surface of the plunger 23. The centering plunger 23 is attached to an annular plate 24 by a bolt 25. The plate 24 carries a stack of Belleville springs 26, a second annular plate 27 resting on the top of the stack. The arrangement comprising the two plates 24, 27 and the stack of Belleville springs 26 is located in a recess 28 machined into a holder 29. The centering plunger 23 is guided in the holder 29 in a bore 30.

An insert 31 is screwed into a threaded opening in the holder 29 and its bottom end forms a backing support for the upper annular plate 27. A thrust ring 32 has a central bore equal to the diameter of the centering plunger 23 and is slidably guided on the plunger 23. A downwardly projecting annulus 33 on the thrust ring 32 bears on the workpiece 8, 9 and contains a number of radial slots 34. The thrust ring 32 carries a centering ring 35 which is formed with a downwardly projecting collar 36 encircling the thrust ring 32. A groove 37 is machined into the periphery of the collar 36 and contains a spring ring 38. The centering ring 35 is divided by a number of radial planes into a plurality of segments. The segments are held together by the encircling spring ring 38. The centering ring 35 has a central bore 39 which widens conically upwards. The lower portion 40 of the holder 29 is a truncated cone shape, the cross sectional diameter of which decreases downwardly. The portion 40 merges upwardly into a flange 41 which extends radially outwards. The flange 41 is formed with a downwardly projecting annulus 42 which bears on the centering ring 35.

A ring-shaped adapter 45 is bolted by bolts 44 to the ram 43 of the press. The adapter 45 has two tubular skirts 46, 47 of different diameters. The holder 29 is axially movable inside the inner skirt 46. The outer circumferential wall of the inner skirt 46 and the internal wall of the outer skirt 47 define an annular chamber 48 which contains a clamping bell 49. The outer skirt 47 projects downwards to a lower level than the inner skirt 46. The lower portion of the inner surface of the outer skirt 47 is conical, the apex of the cone pointing upwards. The wall of the clamping bell 49 is divided by a plurality of radial incisions into a large number of fingers 50. Each finger 50 is convexly shaped on its inner and outer faces. The transverse dimension of the fingers 50 decreases upwardly and the fingers finally merge into a solid ring-shaped base 51 of the bell. The top of the base 51 of the bell is provided, distributed around its periphery, with blind holes 52, and corresponding blind holes 53 are provided in register therewith in the underside of the adapter 45. Each two registering holes 52, 53 contain a coil spring 54 which urges the base of the bell 51 downwards away from the annular chamber 48. The downward movement of the base 51 of the bell is limited by a spring ring 55 positioned in a peripheral groove in the inner skirt 46 of the adapter 45 which ring projects into the annular chamber 48.

The described workholder functions as follows:

Before a workpiece 8 or 9 can be inserted into the hardening press for location, the ram 43 of the press and the inserter 31 must first be raised. The adapter 45 which is bolted to the ram 43 and the clamping bell 49 inside the adapter must also be raised. The spring ring 55 prevents the clamping bell 49 from falling out of the adapter 45. The insert 31 and the holder 29 which is threadedly attached thereto, are pulled away upwards. The centering plunger 23 also participates in this upward motion, since it is attached to the plate 24 and the plate 24 is retained inside the recess 28 in the holder 29. The centering plunger 23 in turn lifts the thrust ring 32 and the centering ring 35 on its dogs 57.

As soon as the centering die 6 appropriate for the workpiece has been inserted into the bore 5 in the press bed 1 and the supporting ring 21 rested on the centering die 6, the bushing 14 of the workpiece 8 or 9 can be fitted on the reduced diameter part of the centering die 6 until the disc-shaped part 15 of the workpiece 8 or 9 rests on the supporting ring 21. The insertion 31 and the holder 29 are then lowered. The centering plunger 23 participates in this movement and its tapering point eventually enters the conically divergent bore 10 in the centering die 6. The centering plunger 23 is thereby pushed upwards until the plate 27 is intercepted by the insertion 31 and the stack of Belleville springs 26 is compressed. The thrust of the stack of Belleville springs 26 which according to the physical properties of the springs may be between 10 and 500 kg expands the centering die 6 so that its machined surface 18 contacts the internal bore of the workpiece bushing 14 and centers the same. Finally the truncated cone 40 of the holder 29 engages the conical bore 39 of the centering ring 35. There then follows a downward movement with a pressing load of 50 to 3,000 kg during which the centering ring 35 is expanded in a radially outward direction until the outside surface of the collar 36 presses on and grips the internal gear teeth 13 of the workpiece tubular portion 12. At the same time the projecting annulus 42 on the holder 29 transmits downward pressure through the interposed centering ring to the thrust ring 32. The annular projection 33 on the thrust ring 32 in turn presses on the disc or plate-shaped portion 15 of the workpiece at a point where this is backed by the supporting ring 21.

Finally, the ram 43 of the press together with the adapter is pressed downwards at a pressure of from 500 to 12,000 kg. The clamping bell 49 participates in this downward movement. The convexly crowned fingers 50 of the bell 49 engage the tubular portion 12 of the workpiece 8 or 9. Owing to the incisions and the reduction in the transverse dimension where the fingers 50 merge into the base 51 of the bell, the fingers 50 can expand radially outwards. During its descent the conical inside surface of the outer skirt 47 of the adapter 45 engages the convexly shaped outside surface of the fingers 50 and applies a force radially inwards to the fingers 50, which they transmit to the tubular portion 12 of the workpiece 8 or 9, whereby they grip the tubular portion in a radially inward direction. When the ram 43 of the press reaches the end of its motion the fingers 50 of the clamping bell finally make contact with the supporting ring 56.

The hot workpiece 8 or 9 is now firmly gripped from all sides and can be quenched for instance in oil without being distorted.

The oil enters through the bores 11 in the centering die 6, flows over the inside and outside of the bushing 14 of the workpiece, then passes through the slots 22 and 34 in the supporting ring 21 and the thrust ring 32 and over both surfaces of the disc-shaped part 15 of the workpiece. Finally the oil flows between the internal gear teeth 13 on the tubular portion 12 of the workpiece and the gaps between the fingers 50 so that it can return over the outside of the tubular portion 12. The sealing ring 4 in the innermost annular slot 2 prevents the oil from issuing between the centering die and the press bed 1.

I claim:

1. A hardening press for a workpiece having a plate-shaped portion and a tubular portion comprising a first means for centering the workpiece, a second means for gripping said plate-shaped portion of said workpiece in the axial direction and said tubular portion in a radially outward direction at the interior thereof, a third means for gripping said tubular portion at the exterior circumference thereof in a radially inward direction, and means for successively actuating said first, second and third means in that order.

2. A hardening press according to claim 1 wherein said first means comprises a centering die and a centering plunger; said second means comprises a supporting ring for said plate-shaped portion of the workpiece, a thrust ring for pressing axially said plate-shaped portion against said supporting ring, a centering ring for gripping said tubular portion at the interior, an axially movable holder for actuating said thrust ring and said centering ring, and Belleville springs for supporting said centering plunger on said holder; and said third means comprises a ram for said press, a ring-shaped adapter attached to said ram, means for displacing said ram and adapter in relation to said holder and independently thereof, a clamping bell on said ring-shaped adapter, cooperating surfaces on said ring-shaped adapter and said clamping bell to deform said clamping bell radially and inwardly, for gripping said tubular portion at the exterior when said ram moves downwardly.

3. A hardening press for a workpiece having a plate-shaped portion, a first tubular portion and a second tubular portion with different diameters, said press comprising a press bed, a centering die extending into said bed for engaging said first tubular portion, a first supporting ring arranged concentrically in relation to said centering die for said plate-shaped portion, a second supporting ring arranged on said bed concentrically in relation to said first supporting ring, a centering plunger engaging the interior of said centering die, a holder for guiding said centering plunger, Belleville springs for supporting said centering plunger on said holder, a thrust ring, a centering ring on said thrust ring, a conical surface on said centering ring and a conical surface on said holder, said conical surfaces being brought into mutual abutment when said holder is lowered, whereby said thrust ring is pressed on said plate-shaped portion and said centering ring on the interior side of said second tubular portion, a press ram, a ring-shaped adapter connected to said ram, said ram and adapter being both arranged concentrically to said holder and being displaceable in relation thereto, a clamping bell guided with axial play in said adapter, said second supporting ring cooperating with said bell, said clamping bell having fingers deformable elastically in the radial direction and being concave-shaped on the inner and outer sides and said fingers abutting on the outer side of said second tubular portion and on a conical surface on said ring-shaped adapter.

* * * * *